UNITED STATES PATENT OFFICE.

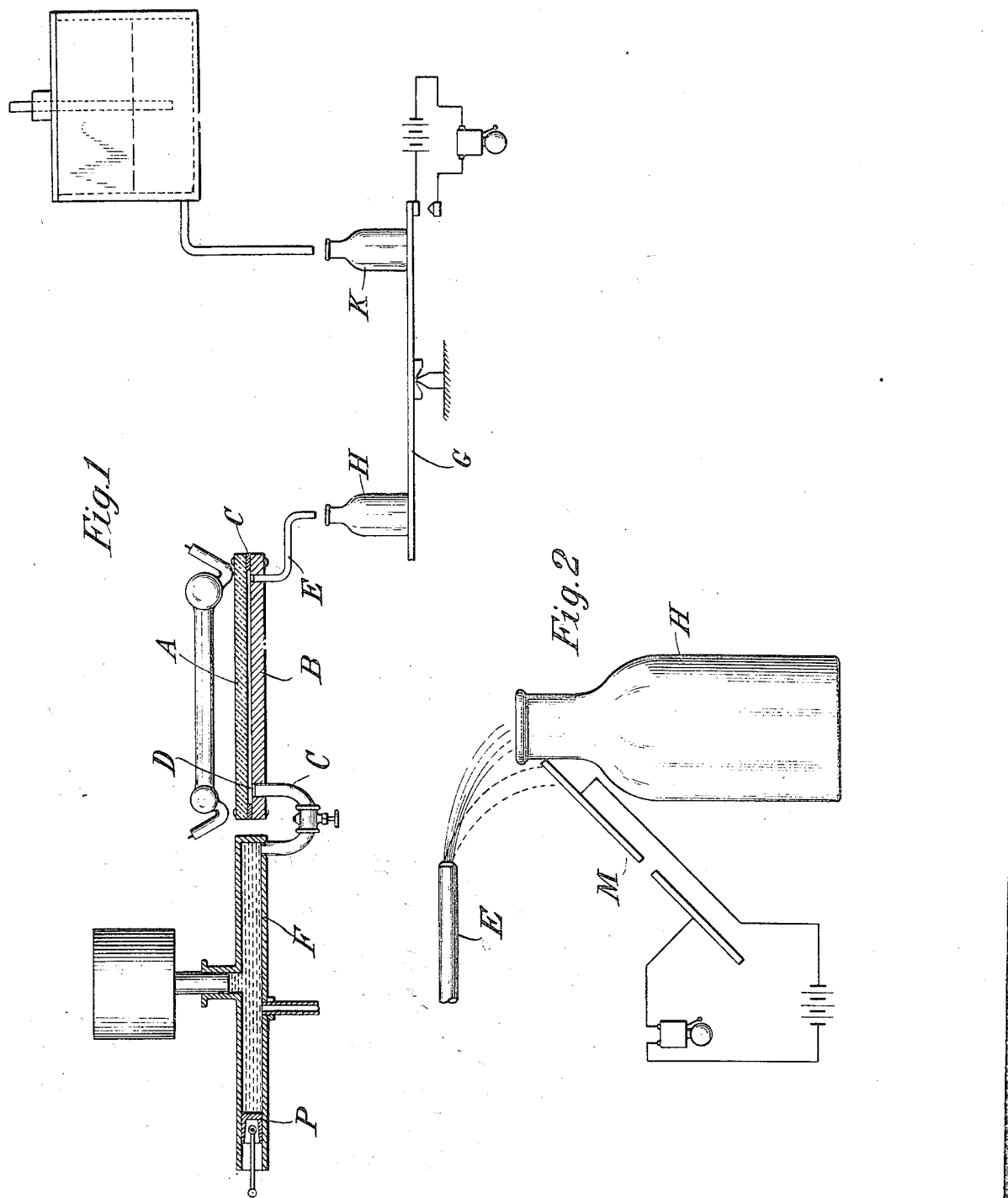

MAX von RECKLINGHAUSEN, OF NEW YORK, N. Y., ASSIGNOR TO THE R. U. V. COMPANY, INC., OF NEW YORK, N. Y., A CORPORATION OF NEW YORK.

APPARATUS FOR STERILIZING MILK.

1,165,921.  Specification of Letters Patent.  Patented Dec. 28, 1915.

Application filed March 14, 1914. Serial No. 824,654.

*To all whom it may concern:*

Be it known that I, MAX VON RECKLINGHAUSEN, a subject of the Emperor of Germany, residing at New York, in the county and State of New York, have invented certain new and useful Improvements in Apparatus for Sterilizing Milk, of which the following is a full, clear, and exact description.

It is well known that the sterilization of fluids which are transparent to the passage of ultra-violet rays may be effected by exposing such fluids to any source from which such rays emanate, and it is also known that milk, which in large masses is opaque to such rays, may be effectively and thoroughly sterilized by exposing it to the action of such rays in films or sheets so thin as to be substantially transparent. It has, however, been found impracticable to thus sterilize milk for ordinary purposes and use, for the reason that the action of the rays thereon imparts to it a disagreeable odor and flavor which renders it unfit for ordinary use, but this may be avoided and perfectly sterilized milk, without impairment of its edible properties, may be produced by passing it in a thin film through the rays at a certain definite and determined rate and temperature, sufficiently slow to effect the sterilization, but not to permit its impairment by the peculiar action thereon of such rays, if prolonged beyond a certain predeterminable time. To render this process practically useful, however, it is essential that some means be used whereby the process may be instantly arrested when for any cause the predetermined rate of flow of the milk is interfered with in any manner.

My present invention has, therefore, as its object the production of a means by the use of which milk may be effectively and properly sterilized, without impairment of its original properties, and by which the process of sterilization may be immediately arrested, when any departure from the arbitrarily established procedure is occasioned by variation of flow or similar causes. With these objects in view, I use an apparatus for exposing the milk to the action of ultra-violet rays, which comprises a plate of quartz secured in such close and fixed relation to a second plate, which may also be of quartz, as to form a receptacle through which the milk may be forced under predetermined pressure in a thin and transparent film, and while in such condition exposed to the sterilizing effect of the rays. With this device, I have combined means for indicating, instantly, if so desired, when the rate of flow varies as may often happen, despite the most careful precautions, by the formation of particles of butter in the comparatively minute passages through which the milk is required to pass, such means being any device responsive to such variations and of which I have illustrated certain examples in the accompanying drawings.

Figure 1 is a part sectional view of the means hereinbefore referred to for exposing the milk to ultra-violet rays, and one means for indicating a variation in the rate of flow. Fig. 2 is a view in elevation of another means for indicating the variation of or arresting the flow.

The apparatus for sterilization comprises two plates A and B, the upper one of which, at least, is of a material transparent to ultraviolet rays, such as quartz. These plates are securely held at a very short distance apart, by any suitable means, such as rivets or clamps, and a flat, somewhat elongated chamber or space is formed between them by the interposition of a sheet of tin foil C, cut to impart to the chamber a proper shape; with contracted or tapered ends, so that there will be a constant and uniform flow from one opening or inlet D, to the other opening or outlet E, at the opposite end.

The tube F, connected in any proper manner to the inlet, conducts the milk into the device at a predetermined pressure, by means of which the flow is regulated. Such means are not illustrated in detail, but are well known, and any device, such as a pump P, that will force the milk at a constant and predetermined pressure, may be employed for the purpose.

The outlet E may be a simple nozzle or extended into a pipe or tube, as the special requirements of the apparatus may demand.

In the use of this apparatus, the milk treated in a well known way is subjected to the action of ultra-violet rays, such as a mercury vapor lamp having a quartz tube. By the action of the ultra-violet rays which emanate from such lamp, the milk will be sterilized, and by test, the rate of flow at which the sterilized milk will issue in a condition in which its original properties are preserved unimpaired, may be readily determined.

It will frequently happen, in spite of all precautions, that the exceedingly limited passage through which the milk is required to flow, becomes sometimes clogged with particles of butter or other solids, and that thereby the rate of flow, under the established pressure, will be reduced. Under such circumstances, it becomes necessary to shut off the pressure or stop the flow immediately, as the issuing milk will be found to have a disagreeable odor and flavor. For this reason it is necessary to use as a part of the apparatus some device that will either effect automatically such stoppage, or give an indication, as by ringing a bell, of the occurrence of a variation in flow, in order that the attendant may immediately take steps to correct it. Many devices may be employed for this purpose. In Fig. 1, for example, I have shown a balanced beam G upon one end of which is placed the bottle H to receive the sterilized milk, and upon the other a similar bottle or receptacle K into which water or other fluid at a predetermined rate is allowed to flow. Should the flow of milk for any reason be reduced, the water descending into the bottle K will overbalance the milk and tip the beam, thus indicating the fact, or effecting through any suitable apparatus the shutting off of the milk supply.

In Fig. 2 another device for the same purpose is shown. In this figure the sterilized milk, projected under pressure from the nozzle E, normally falls into the open mouth of a bottle or jar H, but should any stoppage of the milk passage occur, the trajectory of the issuing stream will be varied and it will fall, not into the jar, but onto something that will give a signal, such as the contacts of a circuit closer M, by means of which, when closed by the milk, a bell is rung or a valve operated.

The above are given only as examples of the best means now known to me for effecting the result desired. Any other device for accomplishing the same purpose may, however, be used, and the invention is not limited in this regard.

What I claim is:—

1. The combination with a milk sterilizing apparatus, of the kind described, of a receptacle into which the stream of milk flowing from the apparatus falls, an alarm mechanism and means, external of the sterilizer, for operating the same, which is caused to act by a variation in the stream between the sterilizer outlet and the receptacle due to any obstruction of the sterilizer.

2. The combination with a milk sterilizing apparatus, of a receptacle for receiving the milk as it flows therefrom, a normally broken electric circuit containing an alarm, the break in said circuit being adapted to be closed by the diversion of the stream of milk when the volume of said stream falls below the normal.

In testimony whereof I affix my signature in the presence of two subscribing witnesses.

MAX von RECKLINGHAUSEN.

Witnesses:
 M. LAWSON DYER,
 JOHN B. McGUIRE.